J. INGLEHART.
Saw-Mill Dogs.

No. 219,948. Patented Sept. 23, 1879.

WITNESSES:
W. W. Hollingworth
Amos W. Hart

INVENTOR:
J. Inglehart
BY
ATTORNEYS.

UNITED STATES PATENT OFFICE.

JACOB INGLEHART, OF EAST SAGINAW, MICHIGAN, ASSIGNOR TO HIMSELF AND GEORGE RUST, OF SAME PLACE.

IMPROVEMENT IN SAW-MILL DOGS.

Specification forming part of Letters Patent No. 219,948, dated September 23, 1879; application filed July 19, 1879.

*To all whom it may concern:*

Be it known that I, JACOB INGLEHART, of East Saginaw, in the county of Saginaw and State of Michigan, have invented a new and Improved Saw-Mill Dog; and I do hereby declare that the following is a full, clear, and exact description of the same.

My invention is an improvement in the class of saw-mill dogs composed of a series of pivoted hooks which act downward, and an opposing hook which acts upward, so that the log is grasped between them, the two sets of hooks being connected by links and operated by a lever.

My improved dog consists of a series of hooks acting downward, and a like series acting upward, the same being attached to rotatable meshing gears, as hereinafter described, and as shown in accompanying drawings, in which—

Figure 2:
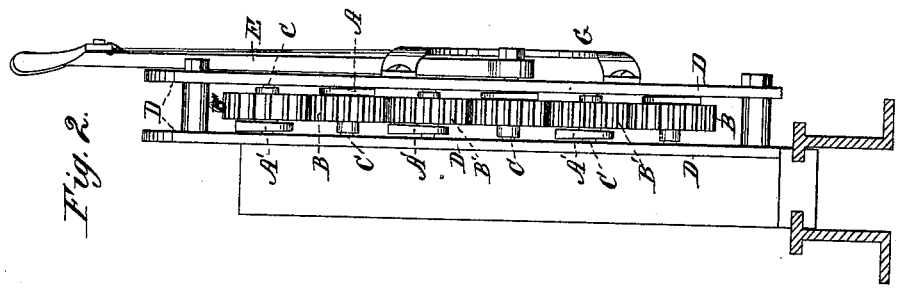
Figure 1:
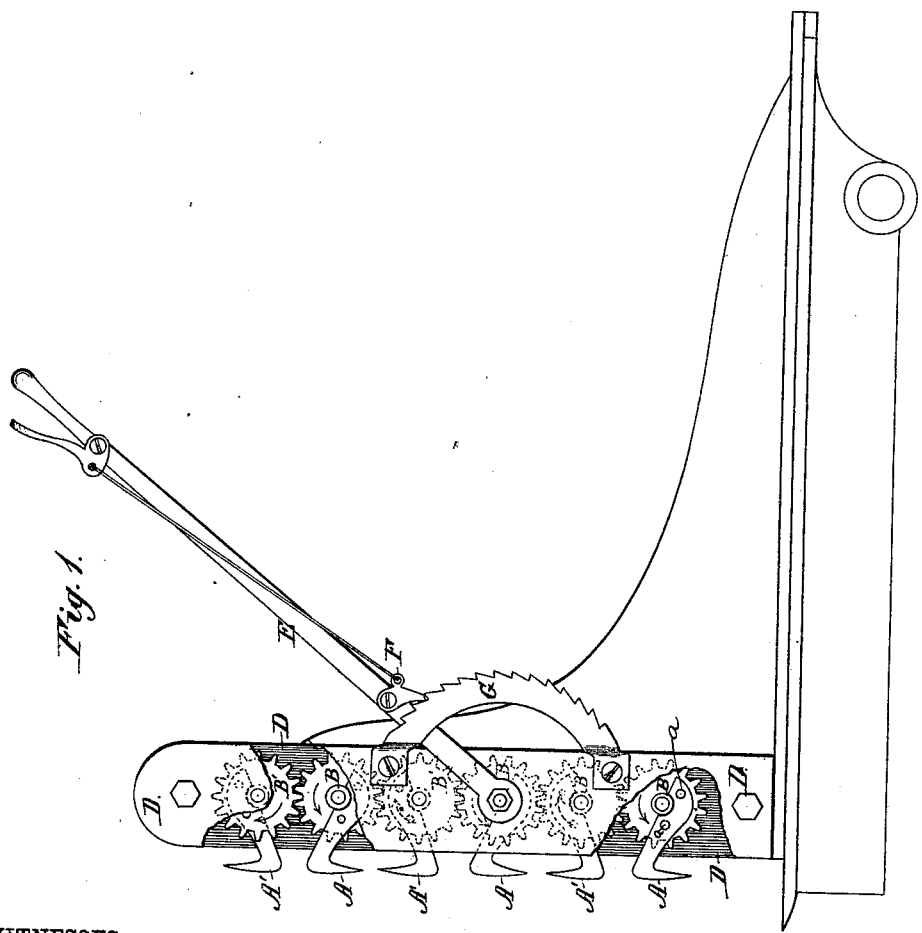

Figure 1 is a side elevation, partly broken away; Fig. 2, a front view of the dog.

One set of hooks or dogs, A, is attached to one side of the gears B and acts downward, and the other set of hooks A' is attached to the other side of the alternate gears, B', and acts upward. The gears B B' mesh, and are arranged in a vertical plane and mounted loose on axes or shafts C, which pass transversely through the standards D. A rotary motion is imparted to all the gears B B' simultaneously by means of a hand-lever, E, which is suitably connected with the middle gear of the series, and may be held locked in any position or adjustment by a spring-catch, F, which engages a fixed semicircular rack, G. When the lever E is moved upward, the gears are thereby rotated in the direction indicated by the arrows, Fig. 1, the series of gears B being adapted to rotate oppositely to the gears B', so that their respective hooks A A' will act in opposite directions, and grasp a log or other timber simultaneously. Contrariwise, when the lever E is moved down, the hooks A' and A will move up and down, respectively, and release the log. The hooks are thus adapted to seize a log at several different points on the same vertical plane, and hold it firm and immovable. Two logs may even be dogged at the same time should it be necessary.

The hooks or dogs have curved shanks, which lie flat against the sides of the gears around the axes C, and are secured by two screw-bolts or rivets that pass through the gears, as shown. This mode of attachment allows any hook to be easily detached when broken or requiring to be sharpened without disturbing any other portion of the dogging apparatus.

The dog is very efficient in action, simple in construction, and adapted to be easily repaired when occasion requires.

What I claim is—

1. In a saw-mill dog, the combination of the series of meshing oppositely-rotatable gears B B' and the hooks A A', attached thereto in the alternation specified, one hook being attached to each gear, and the contiguous hooks of each pair acting in opposite directions, as shown and described.

2. In a saw-mill dog, the combination, with the gears B or B', of the detachable hooks A or A' and the screw-bolts or rivets *a*, passing through the shanks of the hooks and sides of the gears, as shown and described, for the purpose specified.

JACOB INGLEHART.

Witnesses:
M. B. DE LAND,
JOHN VAN SICKLE.